July 28, 1936.  C. H. COLVIN  2,048,920

MAGNETIC COMPENSATOR

Filed Sept. 18, 1934

INVENTOR

Charles H. Colvin

Patented July 28, 1936

2,048,920

UNITED STATES PATENT OFFICE 2,048,920

MAGNETIC COMPENSATOR

Charles H. Colvin, Morris Township, Morris County, N. J.

Application September 18, 1934, Serial No. 744,491

3 Claims. (Cl. 33—225)

This invention relates to improvements in compensators for magnetic compasses and to the method of their use.

Magnetic compensators have been of three general types: first, those employing removable magnets (of various sizes or strengths) in fixed positions; second, those employing non-removable magnets of which the effective magnetic characteristics are variable; and third, those employing removable magnets in variable positions.

Compensators of the first type have had the advantage of simplicity, but the disadvantage of relative inaccuracy and awkwardness of use. Those of the second type have been compact, easily adjusted, and relatively accurate in the correction of semi-circular errors. They have had the disavantage of not only providing no correction for heeling errors but of actually introducing or intensifying such errors. Those of the third type have had the advantages of accuracy and ease of adjustment, but have been too complicated and bulky to be useful upon aircraft, automobiles or small boats.

This invention relates more particularly to improvements in compensators of this third type.

It is an object of this invention to provide a compensator which is simple, rugged, compact, accurate in the correction of both semi-circular and heel errors, and easy to manipulate.

Other objects and advantages will appear as the invention is disclosed and described.

Without limiting myself to the particular forms illustrated, I show preferred embodiments of the invention in the accompanying drawing, as follows.

Figure 1:
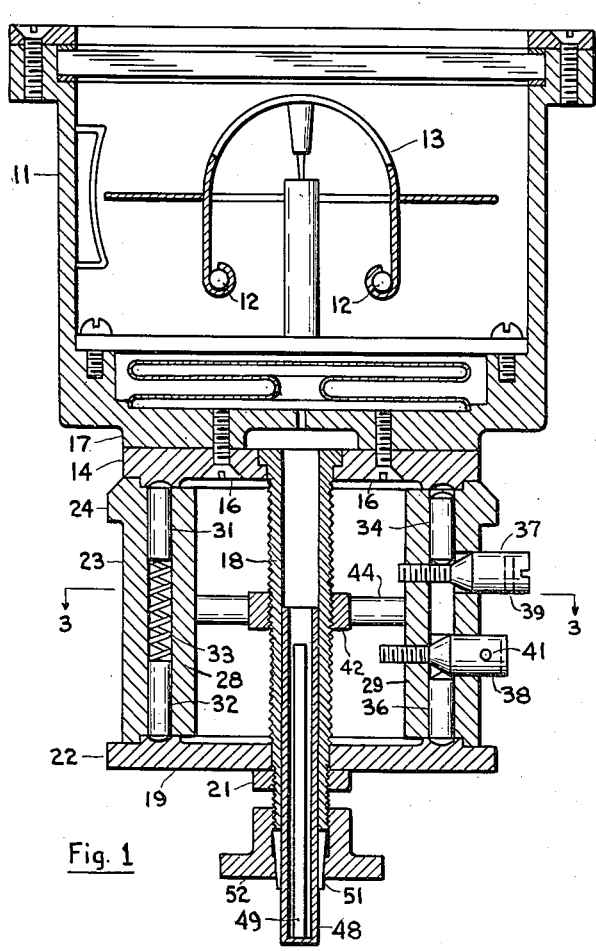
Figure 1 is a vertical section through the compensator (on the line 1—1 of Figure 3) in a form adapted for use with an aircraft compass, to which the compensator is shown attached.
Figure 3:
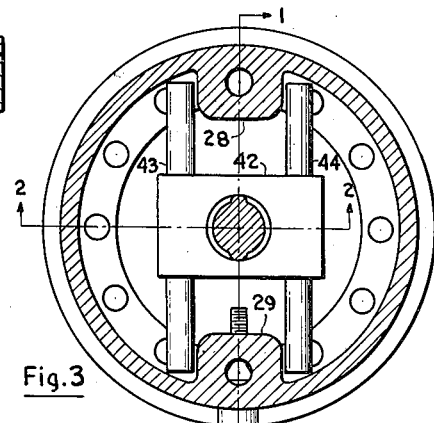
Figure 3 is a horizontal section through the compensator on the lines 3—3 of Figures 1 and 2.
Figure 2:
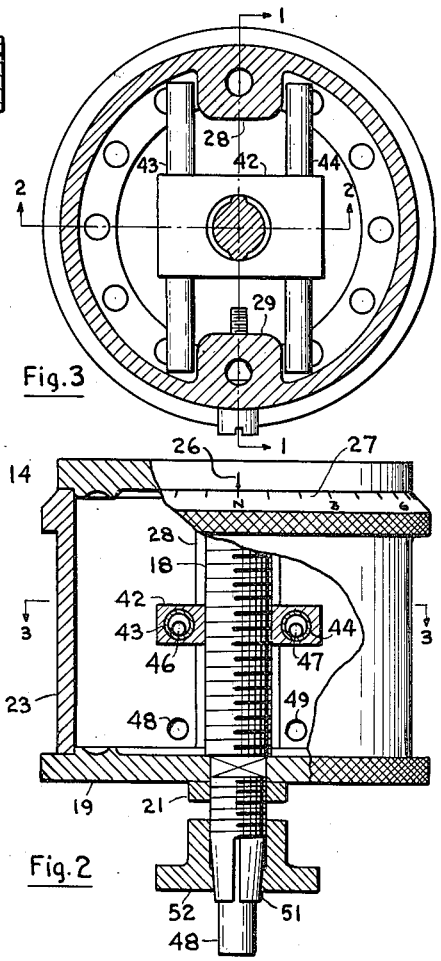
Figure 2 is an elevation view of the compensator, partly in section (on the line 2—2 of Figure 3).

Referring now more particularly to the drawing, the compass 11 represented in Figure 1 forms no part of this invention and is shown to illustrate the mounting of the compensator in relation to the magnets 12 of the magnetic element 13 of the compass. The mounting plate or closure member 14 of the compensator is attached by screws 16 to the bottom of the bowl 17 of the compass 11. It will be appreciated that different types of compass will necessitate different methods of attachment of the compensator, and that it is not necessary that the compensator be attached directly to the compass, as each may be independently attached to a part of the aircraft or boat.

Journaled in the plate 14 is a support or jack-screw 18 to which is attached bottom plate or closure member 19 by nut 21, in such a way that plate 19 is fast to screw 18 and both parts are movable together as a unit. Plate 19 has a knurled rim 22 by which it may be turned.

Interposed between plates 14 and 19, and journaled upon both plates, is an outer case or housing 23 which has near its upper edge a knurled rim 24 by which it may be turned. Above this rim, and readable against an index 26 on plate 14, is a circular scale 27, graduated in degrees or otherwise, in a direction which is the reverse of the normal compass rose; i. e., the graduations proceed from 0 to 360 in a counterclockwise direction when viewed from above.

Within the housing 23 are two bosses 28 and 29 through which extend holes parallel to the axis of jack-screw 18. Matching with the ends of these holes are a series of depressions on the under surface of plate 14 and on the upper surface of plate 19. Within one of these holes are two detent plungers 31 and 32, pressed apart by a spring 33. These plungers, with the corresponding depressions in plates 14 and 19, tend to hold plate 19 in relation to barrel 23, and to hold barrel 23 in relation to plate 14.

Within the other of these holes are two additional detent plungers 34 and 36. These are controlled by the positions of lock-screws 37 and 38, the upper of which is shown in the unlocked position, releasing plunger 34 from locking contact with a depression in plate 14, and the lower of which is shown in the locked position, holding plunger 36 in locked relation with plate 19. Holes 39 and 41 are provided in screws 37 and 38 through which a "safety" or sealing wire may be secured.

Jack-screw 18 carries a thread, preferably a multiple thread, on its surface, on which rides a follower-nut 42 to which are secured magnet tubes or casings 43 and 44. These tubes encase magnets 46 and 47, which are removable when desired through holes 48 and 49 in barrel 23.

Tubes 43 and 44 are guided against rotation by sliding on the sides of bosses 28 and 29.

It is thus apparent that rotation of housing 23 in reference to plate 14 rotates or orients magnets 46 and 47, through an angle which may be read on scale 27, and that rotation of plate 19 in reference to housing 23 raises or lowers magnets 46 and 47, thus decreasing or increasing their distance from the magnets 12 of the compass 11.

Figure 4:
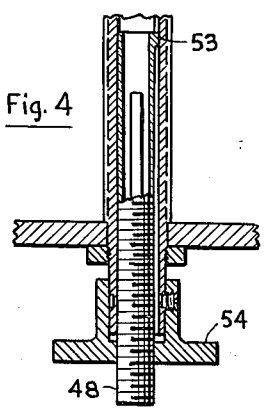
Figure 4 shows, in section, an alternate form of heeling corrector.

Axially slidable within screw 18 is a tube 48 which contains a vertical magnet 49. The position of tube 48 may be manually adjusted and locked by a clutch consisting of jaws 51 on screw 18, which are closed by a nut 52, or as shown in Figure 4, tube 48 may be threaded and have a projecting key 53, being raised and lowered by the rotation of nut 54.

Figure 5:
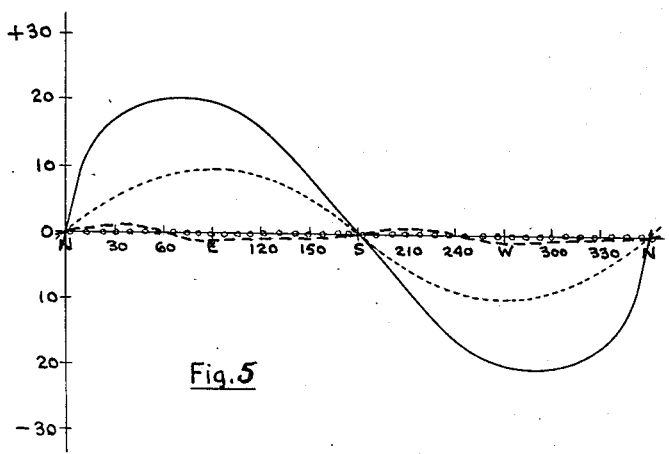
Figure 5 is a chart to which reference will be made in explaining the method of using the compensator on a boat or airplane.

The method of using this invention upon aircraft, boats and automobiles will now be described. If an airplane or boat be headed successively in various directions, the readings of its compass (without correction) noted, and the errors plotted against true magnetic directions, a graph similar to the solid line or Figure 5 will be obtained. Here the errors in readings higher than true have been plotted above the reference line and minus errors plotted below the line. As is apparent from the curve there are two positions (at N and S) where no correction is needed, and two positions (near E and W) where maximum correction is needed. On the craft which gave the curve shown it is apparent that the local magnetism, which the compensator is to balance out, lies in a fore-and-aft direction, since there is no error in the compass indication when the craft is headed north or south. That is to say, when the craft is headed north or south there is no error, and hence the direction of the earth's magnetism and the direction of the local magnetism must coincide. The compensating magnets are now inserted in the tubes 43 and 44 through the holes 48 and 49, in such a way that their north-seeking ends are under the letter S of the scale 27. (They could of course be inserted with their north-seeking ends under the letter N, in which case the following description must be transferred 180°.) Weaker or stronger magnets will be inserted, according to the magnitude of the errors to be corrected. The barrel 23 is then turned in reference to the plate 14 until the N (or zero) comes in line with the index 26.

The airplane or boat is now headed in the direction of maximum error, or in a direction about 90° from that of minimum or zero error, and the lower plate 19 is turned, raising the magnets, until the compass reads correctly, that is until the error is reduced to zero or a minimum. The craft is now "swung" again, noting the compass readings which when plotted as error may give a curve as shown in dash line in Figure 5.

Heeling correction is next made. If the airplane, which was assumed to be in its normal flying attitude during the preceding swinging, now has its tail wheel lowered to the ground (or in the case of a boat if ballast is shifted to produce a heavy list) and is again swung, compass readings if plotted as errors would give a curve like the dotted line of Figure 5. It is not necessary to make such a curve, however, but merely to determine a direction in which there is a large heeling error. With the craft in this position the tube 48 is inserted with a magnet inside, and raised until the compass indicates correctly, at which time it is locked in position (or if the structure of Figure 4 is being used, simply left in position). If the craft is now swung and the compass errors plotted the curve should be that shown in small circles.

Having thus described the structure of my invention and the method of using it, I claim—

1. A compensator for a magnetic compass, comprising in combination, a mounting plate, a vertical, hollow, threaded support rotatably carried by said plate, a casing carried upon said support for threaded adjustment therealong, a magnet carried in said casing, a base plate fixed to and carried by said support, a cylindrical member carried between said two plates whereby to form a chamber enclosing said magnet and casing, guide members carried by and within said cylindrical member and engaging with said casing for maintaining fixed the angular relation of said casing and magnet relatively to said cylindrical member, said cylindrical member and casing being orientable relatively to said mounting plate and bearing cooperating indicia indicating their relative angular position, said support and base plate being rotatable relatively to said cylindrical member to cause axial motion of said casing and magnet relatively to said cylindrical member and support, a second casing within said support, said second casing carrying a second magnet in a normally vertical position and being axially adjustable within said support.

2. A compensator in accordance with claim 1, with detent means between said cylindrical member and said mounting plate, detent means between said base plate and said cylindrical member, locking means between said cylindrical member and said mounting plate, and locking means between said base plate and said cylindrical member.

3. A compensator for a magnetic compass, comprising in combination, a casing, a magnet carried in said casing, a support for said casing, a hollow cylindrical housing, said casing and said support being carried within said housing, substantially flat top and bottom closure members for said housing, said support being rotatable in said top closure member and fixed to said bottom closure member, said housing being rotatable in respect to said top member to effect orientation of said magnet and casing, and said bottom member and said support being rotatable in respect to said housing to effect movement of said magnet and casing along the axis of rotation of said support.

CHARLES H. COLVIN.